(12) United States Patent
Corsi et al.

(10) Patent No.: US 11,916,348 B2
(45) Date of Patent: Feb. 27, 2024

(54) POLARIZATION-MAINTAINING HIGHLY ELLIPTICAL CORE FIBER WITH STRESS-INDUCED BIREFRINGENCE

(71) Applicants: Alessandro Corsi, Quebec (CA); Sophie La Rochelle, Quebec (CA); Junho Chang, Quebec (CA)

(72) Inventors: Alessandro Corsi, Quebec (CA); Sophie La Rochelle, Quebec (CA); Junho Chang, Quebec (CA)

(73) Assignees: HUAWEI TECHNOLOGIES CANADA CO., LTD., Kanata (CA); Université Laval, Quebec (CA)

( * ) Notice: Subject to any disclaimer, the term of this patent is extended or adjusted under 35 U.S.C. 154(b) by 626 days.

(21) Appl. No.: 16/943,713

(22) Filed: Jul. 30, 2020

(65) Prior Publication Data
US 2021/0036480 A1 Feb. 4, 2021

Related U.S. Application Data

(60) Provisional application No. 62/880,928, filed on Jul. 31, 2019.

(51) Int. Cl.
*H01S 3/067* (2006.01)
*H01S 3/16* (2006.01)
(Continued)

(52) U.S. Cl.
CPC ...... *H01S 3/06729* (2013.01); *H01S 3/06712* (2013.01); *H01S 3/06716* (2013.01);
(Continued)

(58) Field of Classification Search
None
See application file for complete search history.

(56) References Cited

U.S. PATENT DOCUMENTS

2002/0033998 A1* 3/2002 Kakui ............... H01S 3/06754
359/341.5
2002/0172485 A1* 11/2002 Keaton ............. G02B 6/03688
385/127
(Continued)

FOREIGN PATENT DOCUMENTS

JP 2010517112 A 5/2010
WO 2011115275 A1 9/2011

OTHER PUBLICATIONS

Ma, "Estimating Ellipticity of a Fiber Core Using Two Types of Interferometry", Optical Review vol. 20, No. 1, pp. 31-35. (Year: 2013).*
(Continued)

*Primary Examiner* — Eric L Bolda

(57) ABSTRACT

An optical fiber comprises a core having an elliptical cross section and a cladding having a circular cross section. The core has an aspect ratio between 2 and 40. The core and the cladding have a common central axis with the core being enclosed by the cladding. The difference of a refractive index of the cladding to a refractive index of the core is between $1 \times 10^{-2}$ and $1.5 \times 10^{-1}$. A trench is located between the core and the cladding. The trench has a uniform width and encircles the core. The refractive index of the trench is lower than the refractive index of the cladding.

13 Claims, 10 Drawing Sheets

100

(51) Int. Cl.
*G02B 6/02* (2006.01)
*G02B 6/036* (2006.01)
*G02B 6/024* (2006.01)

(52) U.S. Cl.
CPC ........ *H01S 3/06754* (2013.01); *H01S 3/1608* (2013.01); *G02B 6/024* (2013.01); *G02B 6/02285* (2013.01); *G02B 6/03627* (2013.01)

(56) References Cited

U.S. PATENT DOCUMENTS

| | | | |
|---|---|---|---|
| 2005/0271347 A1* | 12/2005 | Kimball | C03C 13/046 385/141 |
| 2006/0088261 A1* | 4/2006 | Berkey | H01S 3/06716 385/123 |
| 2006/0171426 A1* | 8/2006 | Starodoumov | H01S 3/0675 372/6 |
| 2008/0181567 A1 | 7/2008 | Bookbinder et al. | |
| 2014/0071521 A1 | 3/2014 | Liu | |

OTHER PUBLICATIONS

Liang et al. "Design and fabrication of elliptical-core few-mode fiber for MIMO-less data transmission", Optics Letters, vol. 41, No. 13, Jul. 1, 2016, pp. 3058-3061. (Year: 2016).*

Trinel et al. "Optical amplifier sharing for single mode fibers: Amplification of 5 non-degenerate modes in an elliptical-core FM-EDFA ", 2015 European Conference on Optical Communication (ECOC), Valencia, Spain, 2015, pp. 1-3 (Year: 2015).*

Anwar et al., "On the Performance of Few-Mode EDFAs with Bidirectional Pumping", Asia Communications and Photonics Conference OSA 2016 (Year: 2016).*

Wang et al. "MDM transmission of CAP-16 signals over 1.1-km anti-bending trench-assisted elliptical-core few-mode fiber in passive optical networks", Optics Express vol. 25, issue 18, pp. 22991-23002. (Year: 2017).*

Bo-Hun Choi et al: "New pump wavelengthof 1540-nm band for long-wavelength-banderbium-doped fiber amplifier (I-bandedfa)", IEEE Journal of Quantum Electronics, USA, vol. 39, No. 10,Oct. 1, 2003 (Oct. 1, 2003), 1272-1280, XP011101 713.

René-Jean Essiambre et al "Capacity Limits of Optical Fiber Networks"; Journal of Lightwave Technology, vol. 28, No. 4, Feb. 15, 2010.

Peter J. Winzer et al "Fiber-optic transmission and networking: the previous 20 and the next 20 years [Invited]"; vol. 26, No. 18 | Sep. 3, 2018 | Optics Express 24190.

Nicolas K. Fontaine et al "30X30 MIMO Transmission over 15 Spatial Modes"; OFC Postdeadline Papers @ OSA 2015.

Roland Ryf et al "High-Spectral-Efficiency Mode-Multiplexed Transmission over Graded-Index Multimode Fiber"; European Conference on Optical Communication Post Deadline Papers (2018).

Daiki Soma et al "257-Tbit/s Weakly Coupled 10-Mode C + L-Band WDM Transmission"; Journal of Lightwave Technology, vol. 36, No. 6, Mar. 15, 2018.

Guoxuan Zhu et al "Scalable mode division multiplexed transmission over a 10-km ring-core fiber using high-order orbital angular momentum modes"; vol. 26, No. 2 | Jan. 22, 2018 | Optics Express 594.

Nenad Bozinovic et al "Terabit-Scale Orbital Angular Momentum Mode Division Multiplexing in Fibers"; Science 340, 1545 (2013).

Reza Mirzaei Nejad et al "Mode Division Multiplexing Using Orbital Angular Momentum Modes Over 1.4-km Ring Core Fiber"; Journal of Lightwave Technology, vol. 34, No. 18, Sep. 15, 2016.

Lixian Wang et al "Linearly polarized vector modes: enabling MIMO-free mode-division multiplexing"; vol. 25, No. 10 May 15, 2017 | Optics Express 11736.

Haozhe Yan et al "Design of PANDA ring-core fiber with 10 polarization-maintaining modes"; vol. 5, No. 1 / Feb. 2017 / Photon. Res.

Jiajia Zhao et al "Polarization-maintaining few mode fiber composed of a central circular-hole and an elliptical-ring core"; vol. 5, No. 3 / Jun. 2017 / Photonics Research.

Patrick Gregg et al "13.4km OAM state propagation by recirculating fiber loop"; vol. 24, No. 17 | Aug. 22, 2016 | Optics Express.

Alessandro Corsi et al "Design of Highly Elliptical Core Ten-Mode Fiber for Space Division Multiplexing With 2 x 2 MIMO"; IEEE Photonics Journal, vol. 11, No. 2, Apr. 2019.

Waclaw Urbanczyk et al "Dispersion effects in elliptical-core highly birefringent fibers"; Apr. 20, 2001 y vol. 40, No. 12 y Applied Optics.

Giovanni Milione et al "MIMO-less Space Division Multiplexing with Elliptical Core Optical Fibers"; Optical Society of America, 2017, paper Tu2J.1.

M. Shah Alam et al "Modal Propagation Properties of Elliptical Core Optical Fibers Considering Stress-Optic Effects"; International Journal of Electrical and Computer Engineering 5:4 2010.

Rongfeng Guan et al "Stress birefringence analysis of polarization maintaining optical fibers"; Optical Fiber Technology 11 (2005) 240-254.

L. Wang et al "Characterization of OAM fibers using fiber Bragg gratings"; Jun. 30, 2014 | vol. 22, No. 13 | DOI:10.1364/OE.22. 015653 | Optics Express.

Alessandro Corsi et al "Mode Loss Measurement in Few-Mode Fibers With a Microwave Interferometric Technique"; IEEE Photonics Technology Letters, vol. 30, No. 6, Mar. 15, 2018.

Ezra Ip et al "SDM transmission of real-time 10GbE traffic using commercial SFP+ transceivers over 0.5km elliptical-core few-mode fiber"; Jun. 29, 2015 | vol. 23, No. 13 | DOI:10.1364/OE.23.017120 | Optics Express.

F. Parmigiani et al "Elliptical Core Few Mode Fibers for Multiple-Input Multiple Output-Free Space Division Multiplexing Transmission"; IEEE Photonics Technology Letters, vol. 29, No. 21, Nov. 1, 2017.

Corsi Alessandro et al., Design of a Ten-Mode Polarization-Maintaining Few-Mode Fiber for MIMO-less Data Transmission, 2018 European Conference on Optical Communication (ECOC) Conference Paper, U.S.A., IEEE, Sep. 23, 2018, total:4pages.

* cited by examiner

100

200

400

500

1500

POLARIZATION-MAINTAINING HIGHLY ELLIPTICAL CORE FIBER WITH STRESS-INDUCED BIREFRINGENCE

CROSS-REFERENCE TO RELATED APPLICATIONS

This application claims the benefit of priority to U.S. patent application Ser. No. 62/880,928 entitled "POLARIZATION-MAINTAINING HIGHLY ELLIPTICAL CORE FIBER WITH STRESS-INDUCED BIREFRINGENCE" filed Jul. 31, 2019, which is hereby incorporated by reference in its entirety.

FIELD OF THE INVENTION

The present invention pertains to the field of fiber optic communications and in particular to an elliptical core optical fiber.

BACKGROUND

The demand for Internet traffic and cloud computing places high demands on our current optical communications infrastructures. In particular, high bandwidth links are required for short-reach interconnects such as those found in data centers. Mode division multiplexing (MDM) over few-mode fibers (FMFs) is a promising approach to satisfy these data traffic demands. In MDM systems, the crosstalk between the spatial modes is one of the most critical impairments to signal quality.

In present MDM systems, multiple-input multiple-output (MIMO) digital signal processing (DSP) are generally required to compensate for channel crosstalk and receive information data at the receiver side. A drawback of this full-MIMO approach is its complexity. Although the complexity can be reduced to some extent by minimizing differential modal group delay, it still requires heavy computational resource and power consumption.

In order into reduce the DSP complexity, various design strategies in FMF have been proposed. One approach is to increase the effective index difference, $\delta n_{\it eff}$, between the spatial modes in order to reduce the complexity of the MIMO-DSP components.

Although a partial MIMO-DSP approach may reduce the system complexity it is still desirable to have a MIMO-free design. To achieve this, some solutions propose polarization-maintaining (PM) FMF designs in which the polarization degeneracies of the spatial modes are reduced by using elliptical ring-core fiber (ERCF), PANDA ring-core fiber, or ERCF with an inner air hole. These fiber designs aim to enhance the effective index difference between adjacent vector modes. However, these solutions suffer from the drawback that the number of modes is limited.

Therefore, there is a need for optical fiber, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an improved optical fiber for use in an MDM communications system.

An aspect of the disclosure includes an optical fiber including a core having an elliptical cross section and an aspect ratio between 2 and 40. The optical fiber also includes a cladding having a circular cross section, with the cladding enclosing the core.

An aspect of the disclosure includes the core and the cladding having a common central axis.

An aspect of the disclosure includes an optical fiber wherein a difference of a refractive index of the cladding to a refractive index of the core is between $1\times10^{-2}$ and $1.5\times10^{-1}$.

An aspect of the disclosure includes an optical fiber wherein a ratio of a refractive index of the cladding to a refractive index of the core is between $1\times10^{-2}$ and $1.5\times10^{-1}$.

An aspect of the disclosure includes an optical fiber comprises a trench located between the core and the cladding. The trench has a uniform width and encircles the core. The refractive index of the trench is lower than the refractive index of the cladding.

An aspect of the disclosure includes an optical fiber wherein a width of the core along a y-axis allows for single mode transmission.

An aspect of the disclosure includes an optical fiber wherein a width of the core along an x-axis allows for the transmission of a plurality of mode pairs.

An aspect of the disclosure includes an optical fiber wherein each of the plurality of mode pairs have two orthogonal linear polarizations.

An aspect of the disclosure includes an optical fiber wherein the plurality of mode pairs have an effective index separation between the adjacent vector modes greater than $1\times10^{-4}$.

An aspect of the disclosure includes an optical fiber wherein the effective index separation is caused by thermal stress induced during the manufacture of the optical fiber and the elliptical shape of the core.

An aspect of the disclosure includes an optical fiber wherein the core is doped with rare earth ions.

An aspect of the disclosure includes an optical fiber amplifier (OFA) including a first WDM coupler receiving an input signal and an output from a first pump optical source. An optical fiber receiving an output from the first WDM coupler. The optical fiber includes a core having an elliptical cross section having an aspect ratio between 2 and 40. The optical fiber also includes a cladding, having a circular cross section, enclosing the core. The OFA also includes a second WDM coupler receiving the output of the optical fiber and an output of a second pump optical source. The second WDM coupler outputs an amplified optical signal.

An aspect of the disclosure includes an OFA wherein the core and the cladding have a common central axis.

An aspect of the disclosure includes an OFA wherein the core is doped with rare earth ions.

An aspect of the disclosure includes an OFA wherein the optical fiber includes a trench located between the core and the cladding. The trench has a uniform width and encircles the core. The refractive index of the trench is lower than the refractive index of the cladding.

An aspect of the disclosure includes an OFA wherein a width of the core along a y-axis allows for single mode transmission and a width of the core along an x-axis allows for the transmission of a plurality of mode pairs.

An aspect of the disclosure includes a method for manufacturing an optical fiber. The method includes preparing a cylindrical preform having a cross section comprising an inner core and an outer cladding. The inner core has a circular profile. Cutting two opposing sides of the cylindrical preform along a length of the cylindrical preform to produce a cut preform with opposing parallel surfaces along a longitudinal axis of the cut preform. Heating the cut preform until the cut preform has a circular profile and an inner core of the cut preform has an elliptical profile. Pulling the cut preform to form the optical fiber having a core with an elliptical profile. The core has an aspect ratio between 2 and 40, and a cladding has a circular cross section, with the core being enclosed by the cladding.

An aspect of the disclosure includes the core and the cladding have a common central axis.

An aspect of the disclosure includes a trench portion situated between the core and the cladding. The trench portion is present in the optical fiber and isolates the core from the cladding.

An aspect of the disclosure includes a cylindrical preform that is fabricated using a modified chemical vapor deposition (MCVD) process.

In another aspect of the disclosure the preform further includes a trench portion situated between the core and the cladding. The trench portion is present in the optical fiber and isolates the core from the cladding.

In another aspect of the disclosure, the elliptical profile is formed due to surface tension and the flow of material during the heating.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the invention comprise a polarization-maintaining highly elliptical core fiber (HECF). By combining the highly elliptical core shape and the thermal stress induced during the fiber fabrication, the birefringence values are elevated to be higher than $1 \times 10^{-4}$, which reduces the mode coupling and in turn makes this fiber suitable for use in MIMO-free MDM transmission systems.

Figure 1:
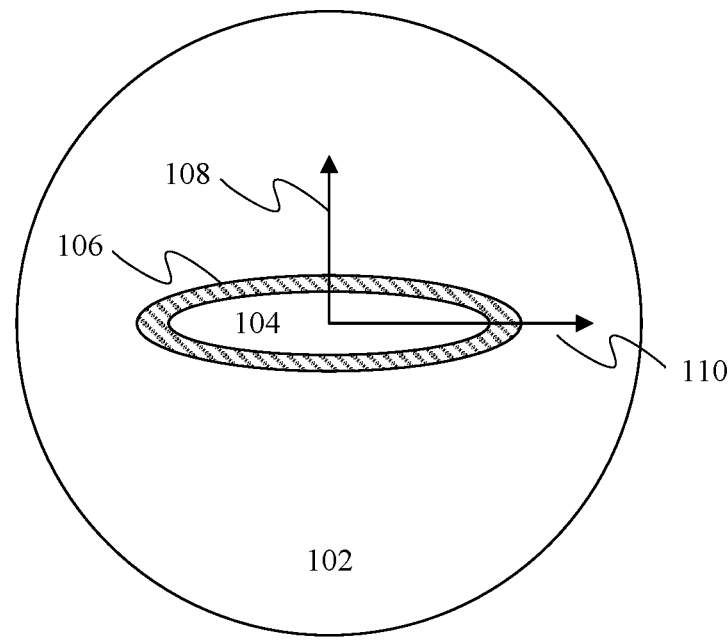
FIG. 1 illustrates a cross sectional view of an optical fiber according an embodiment.

FIG. 1 illustrates a cross-section view of a highly elliptical core fiber (HECF) 100 according to a first embodiment of the invention. The optical fiber comprises a cladding 102, which is typically the industry standard, 125 µm in diameter. At the center of the fiber is a solid core 104 surrounded by a trench 106. Though not shown in FIG. 1, in most embodiments, the cladding is further surrounded by a buffer, which is in turn covered by a jacket as is known in the art.

The cross-section profile of the core 104 is elliptical in shape. The core's cross section 104 has an x-axis 110 and a y-axis 108. In one embodiment the core 104 has approximate cross-sectional dimensions of 38.5 µm 202 along the x-axis 110 and 6.1 µm along the y-axis 108. The dimension along the short, y-axis 108, is selected to allow for single mode operations, n=1 for $TE_{m,n}/TM_{m,n}$ modes. The dimension of the x-axis 110 is selected to allow for multiple spatial modes to be distributed in a one-dimensional array in the x-axis 110. In other embodiments, the aspect ratio, η, of the core, defined as the ratio of the cross-sectional length in the x-direction to the cross-sectional length in the y-direction, is between 2 and 40. Those skilled in the art will appreciate that the x-axis 110 may also be referred to as the major axis of the elliptical core, while the y-axis 108 may be referred to as the minor axis of the elliptical core. Rotation of the fiber so that the major axis is no longer horizontal should not be considered to be changing the alignment of the X and Y-axes. Those skilled in the art will also appreciate that the aspect ratio, η, may also be considered as the ratio of the width of the core along the x-axis 110 to the width of the core along the y-axis 108.

The core 104 may be thought of as elliptic cylinder, such that the length of the x-axis 110 is greater than the length of the y-axis and therefore, the x-axis 110 forms the major axis of the ellipse and the y-axis 108 forms the minor axis of the ellipse. The x-axis 110 and the y-axis 108 intersect at a right angle and the intersection of the x-axis 110 and the y-axis 108 defines the center of the elliptical cross-section. The core 104 has the shape of an elliptic cylinder with a central axis, also known as a longitudinal axis, running through the center of each elliptical cross-section of the core 104. The cladding 102 may be viewed as having a circular cross section with a center and has a cylindrical shape with a central axis running through the center of each circular cross-section of the cladding 102. The core 104 and the cladding 102 have a common central axis, such that the core 104 is centered within the cladding 102. Accordingly, the HECF is formed so that the cladding 102 and the core 104 share a common central axis.

Optical fiber is manufactured using a silica glass material comprised mainly of $SiO_2$ and the cladding 102 is comprised of a substantially pure silica glass material. The core 104 is manufactured by doping the $SiO_2$ material with $GeO_2$. In some embodiments, the core 104 is comprised of $SiO_2$ doped with 7.3 mol % of $GeO_2$.

The trench 106 surrounds the core 104 and, in some embodiments is approximately 4.7 µm wide 206. The trench is made of $SiO_2$ doped with F, fluorine. In some embodiments the trench is doped with 2 mol % of F. The bending loss experienced by the HECF increases as the aspect ratio increases, however the trench serves to reduce the bending loss of higher-order modes in the optical fiber.

Figure 2:
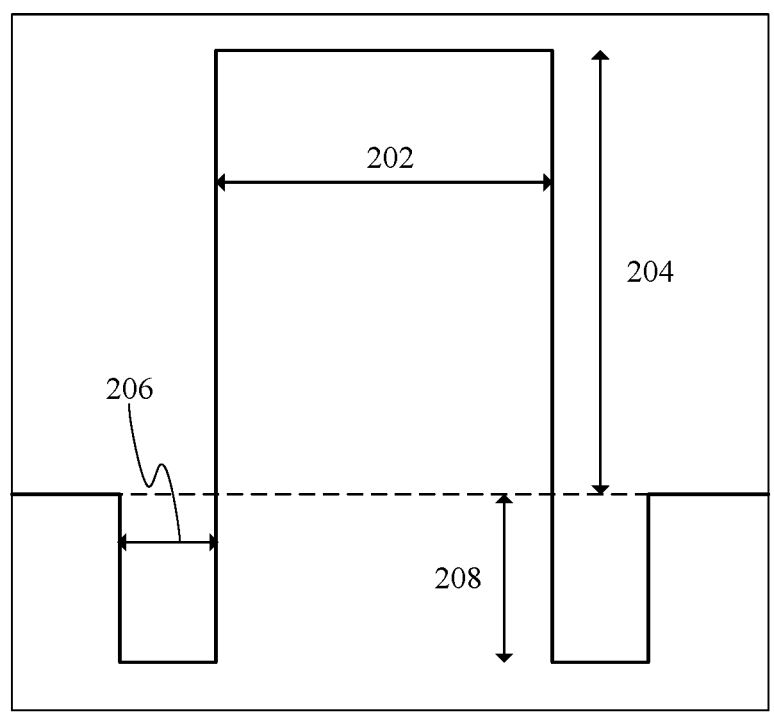
FIG. 2 illustrates a refractive index profile along the x-axis of an optical fiber according an embodiment.

FIG. 2 shows the refractive index profile along the x-axis 110 for the optical fiber 100. The core 104, trench 106, and cladding 102 have differing refractive indexes determined by their respective materials. In one embodiment the difference in refractive index between the core 104 and cladding 102, $\Delta n$ 204, is approximately $1.1 \times 10^{-2}$. In embodiments, the refractive index difference between the core 104 and the cladding 102 is within the range $1 \times 10^{-2} \leq \Delta n \leq 1.5 \times 10^{-1}$. In one embodiment the difference in refractive index between the trench 106 and the cladding 102, $-\Delta n_{trench}$ 208, is approximately $5.7 \times 10^{-3}$.

The geometry of the highly elliptical core leads to geometry-enhanced birefringence in the optical fiber. This source of birefringence is related to the geometric structure of the core, where a higher core aspect ratio will cause a higher value of birefringence.

Figure 3:
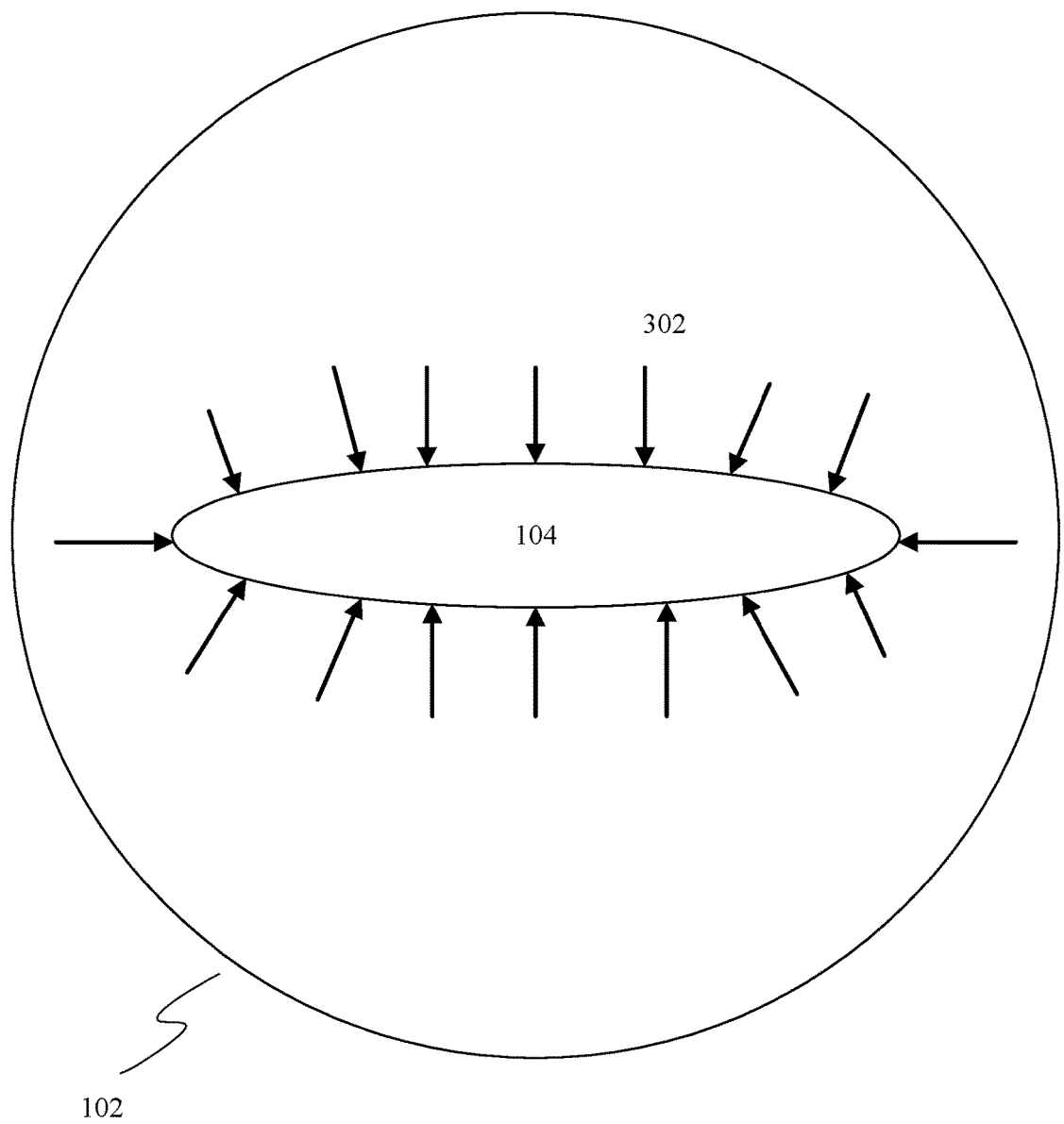
FIG. 3 illustrates a cross sectional view of an optical fiber and the compressive thermal stress that is induced into the core along the normal direction of the core/cladding border during the fiber drawing process.

Referring to FIG. 3, during manufacture of the optical fibre, inconstant, compressive thermal stress 302 is induced into the core 104, mainly along the y-axis 108 direction. During the fiber drawing and annealing process, the fiber becomes stressed due to different thermal expansion coefficients of the core 104 and the cladding layers 102. Different amounts of stress are applied along long, x-axis 110 and short, y-axis 108 due to the asymmetry of its core structure. With the increase of this stress, the isotropic glass starts to become anisotropic, with a consequent change of the refractive indices along the principal, x and y stress directions. The thermal stress has the effect to increase the effective index difference ($\delta n_{eff}$) between the two polarizations of the same spatial mode.

Optical fiber according to an embodiment of the invention may transmit data on five spatial mode groups with two-fold polarization degeneracy to obtain ten MDM channels. The supported modes are labeled as $TE_{1n}$ and $TM_{1n}$, depending on the polarization state (respectively along the x-axis or the y-axis). In particular, the subscript "1" indicates the single mode operation along the short-axis (y-axis), while "n" is an integer indicating the number of the dark lines of the mode profile along the long-axis (x-axis).

The elliptical shape of the core combined with thermal stress created during manufacturing produces a relatively large birefringence so that the modal effective index separation, $\delta n_{eff}$, is greater than $1 \times 10^{-4}$. This reduces the mode coupling inside the HECF so that the fiber modes can propagate without significant crosstalk up to a fiber length of approximately 1 km. This allows for transmission systems to be designed that do not require MIMO DSPs.

In some embodiments the core may be doped with rare earth ions such as one or both of erbium and ytterbium in order to produce an optical active fiber.

Figure 4:
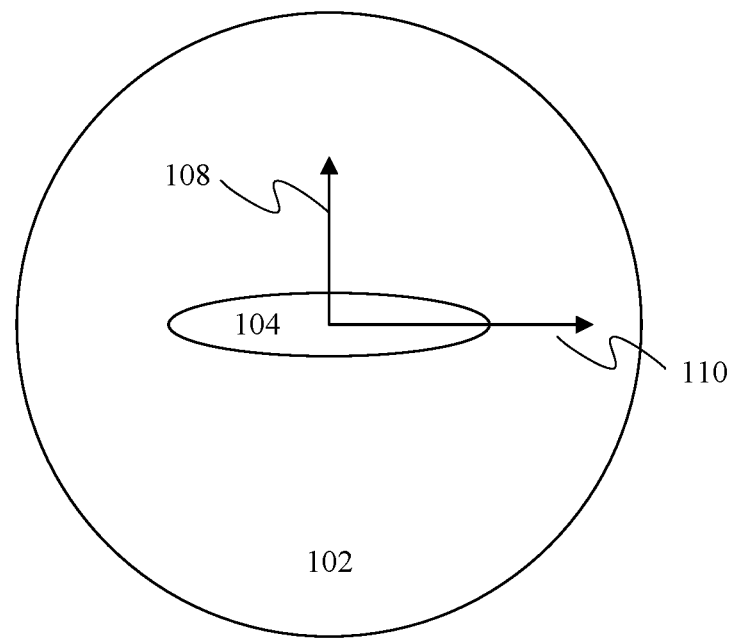
FIG. 4 illustrates a cross sectional view of an optical fiber according another embodiment.

FIG. 4 illustrates an optical fiber 400 according to another embodiment with an alternative structure. In comparison to the embodiment depicted in FIG. 1, this embodiment comprised a cladding 102 and core 104, but lacks a trench 106 between the core and cladding. The trench 106 helps to reduce the bending loss of higher-order modes in the fiber. However, in some embodiments, the bending loss may also be reduced by increasing the refractive index difference 204, $\Delta n$, to approximately $1.5 \times 10^{-1}$.

Figure 5:
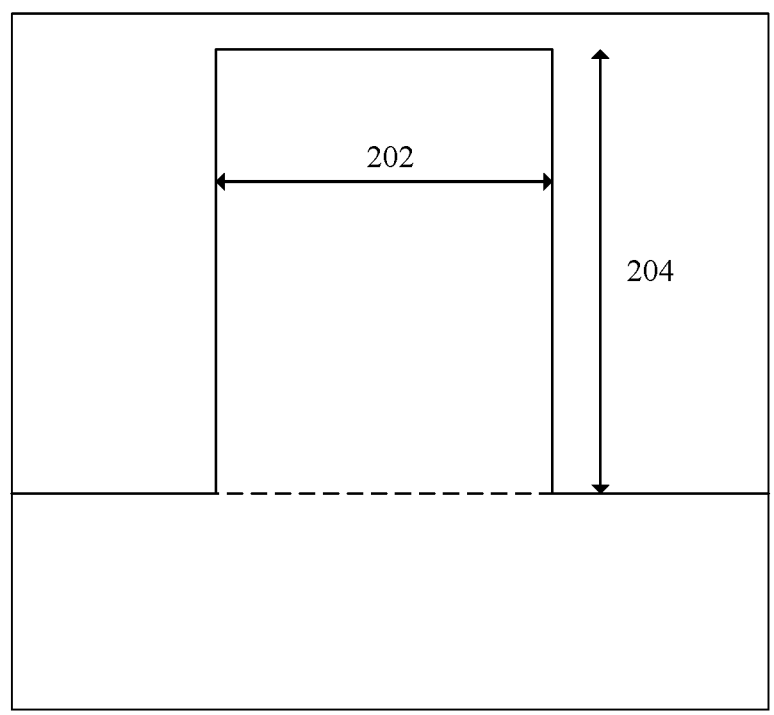
FIG. 5 illustrates a refractive index profile along the x-axis of an optical fiber according an embodiment.

FIG. 5 shows the refractive index profile along the x-axis 110 for the optical fiber 400. The core 104 and cladding 102 have differing refractive indexes determined by their respective materials. In one embodiment the difference in refractive index between the core 104 and cladding 102, $\Delta n$ 204, is approximately $1.1 \times 10^{-2}$.

Figure 6:
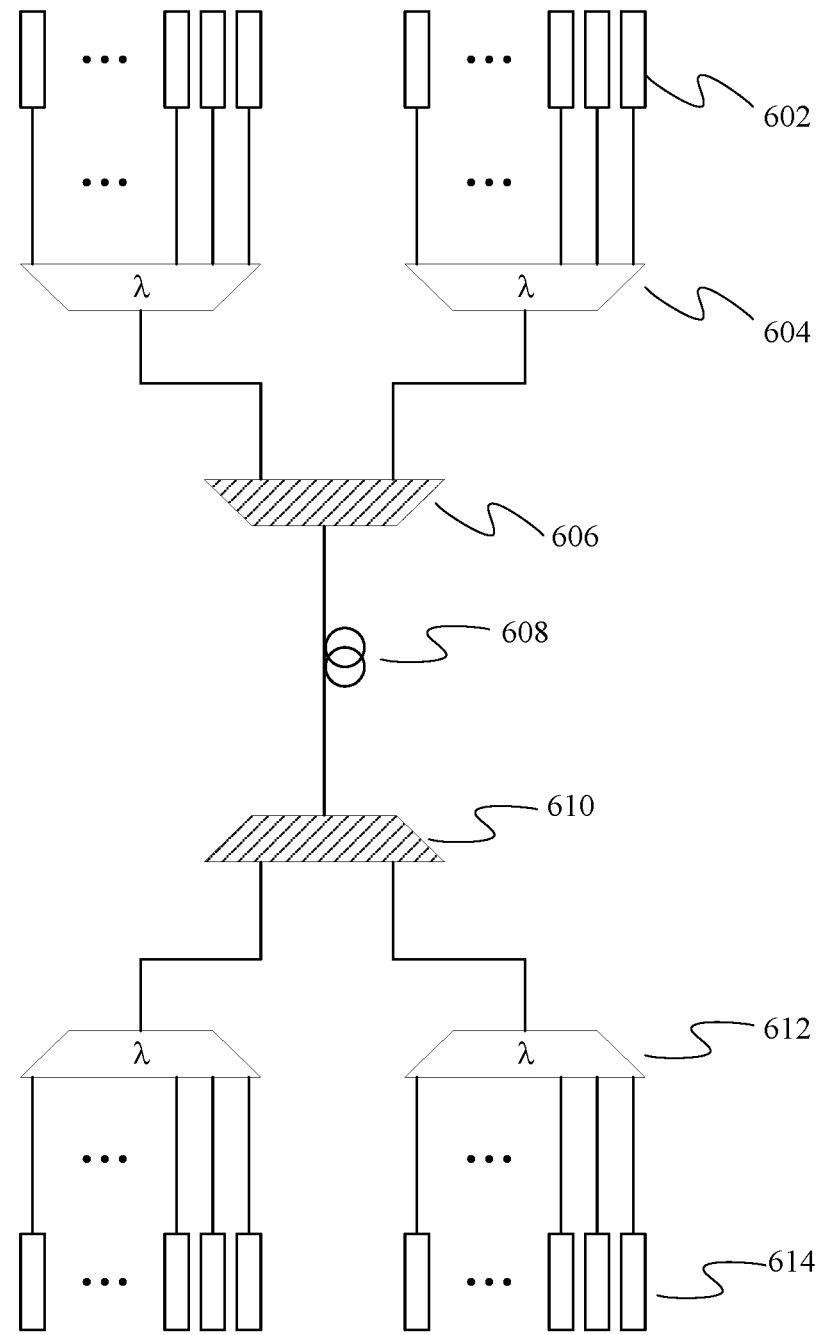
FIG. 6 illustrates a combined WDM and MDM optical communications system.

FIG. 6 illustrates a system incorporating embodiments of the invention. The invention can be used in the MIMO-free mode-division multiplexing system. The outputs from WDM transmitters 602 are input to WDM couplers 604 and are multiplexed into a single output fiber. Each of the outputs from the WDM couplers 604 are then multiplexed by the mode multiplexer 606 and converted into a corresponding mode in the HECF 608 and. After transmission through the HECF 608, the fiber modes are received and separated by the mode demultiplexer 610 following by a number of WDM couplers 612 to separate the wavelength channels and finally be detected by the receivers 614. Due to the low crosstalk among the modes inside the fiber, a MIMO-DSP is not required.

Figure 7:
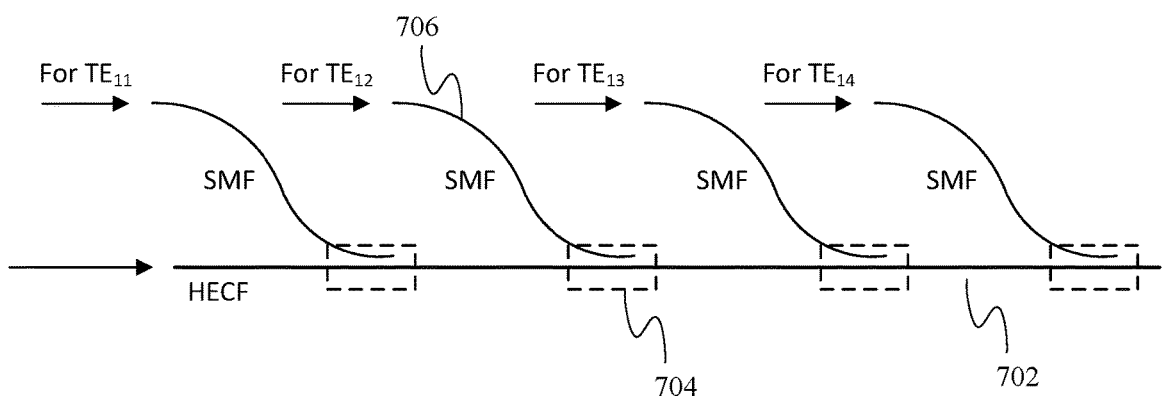
FIG. 7 illustrates the mode multiplexing of data onto an optical fiber according to an embodiment.

FIG. 7 illustrates an embodiment of a mode division multiplexer utilizing HECF 702. Optical inputs of different modes $TE_{11}$, $TE_{12}$, ..., $TE_{1n}$ may be multiplexed onto the HECF 702 using fused fiber mode couplers 704.

Figure 8:
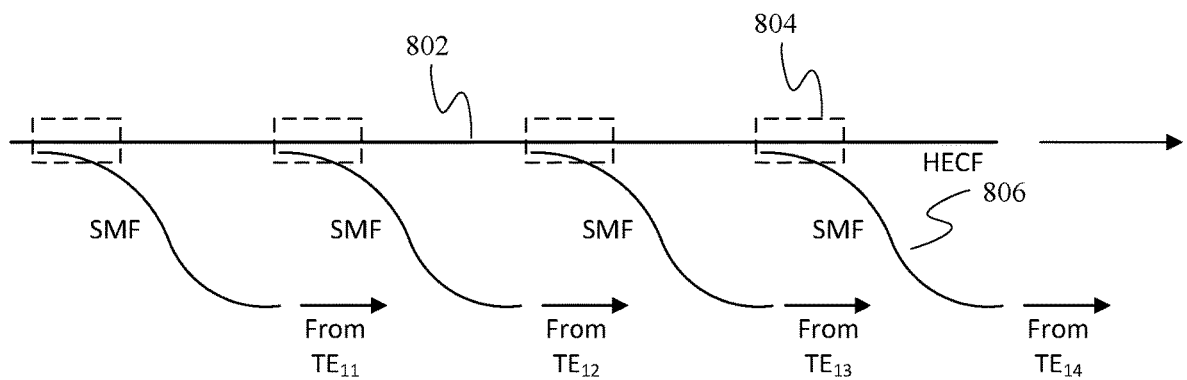
FIG. 8 illustrates the mode demultiplexing of data onto an optical fiber according to an embodiment.

FIG. 8 illustrates an embodiment of a mode division demultiplexer utilizing HECF 802. Fused fiber mode couplers 804 pass light of a predetermined mode to output optical fibers 806 in order to receive the signals from $TE_{11}$, $TE_{12}$, ..., $TE_{1n}$.

Figure 9:
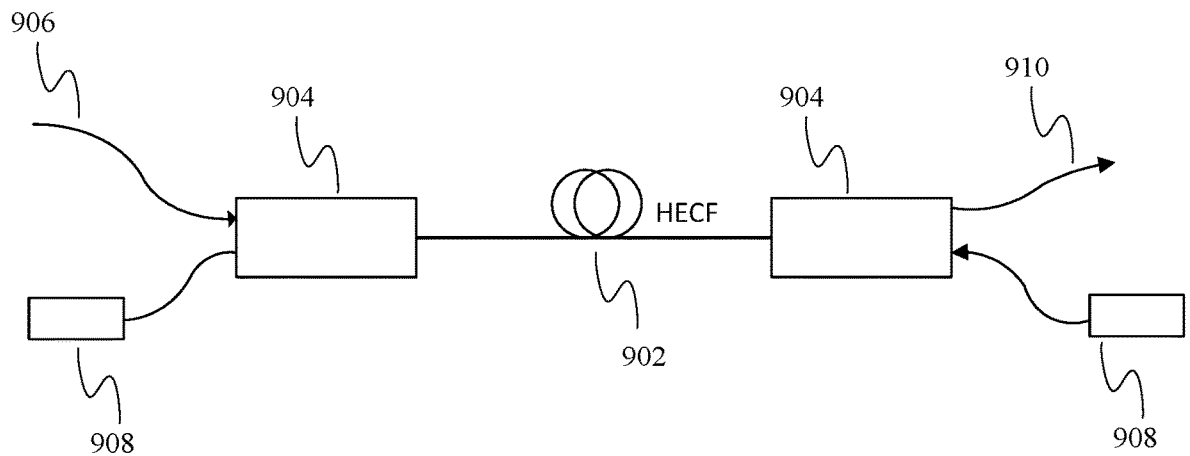
FIG. 9 illustrates an optical fiber amplifier utilizing an optical fiber according to an embodiment.

FIG. 9 illustrates an optical fiber amplifier (OFA) 900 comprising an HECF 902 according to an embodiment. The HECF 902 has a core that is doped with rare earth ions such as erbium and connects two WDM couplers 904. Each of the WDM couplers receives the output of pump diodes 908. The optical power of the input 906 is amplified by the OFA and output on fibre 910.

Figure 10:
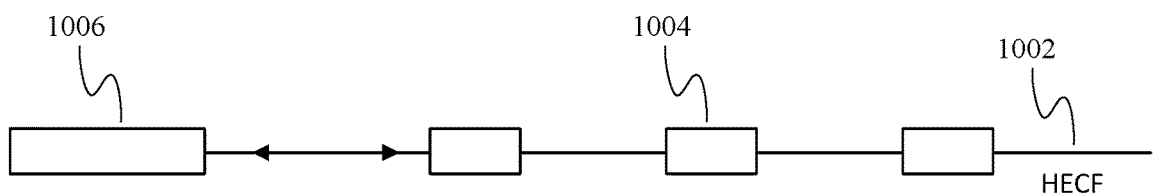
FIG. 10 illustrates an optical fiber sensing apparatus utilizing an optical fiber according to an embodiment.

FIG. 10 illustrates a sensing system 1000 according to another embodiment. The HECF 1002 passes through sensing elements 1004. The signal source and data acquisition module are co-located in device 1006. In some embodiments, sensing elements 1004 are fiber Bragg gratings (FBG). When light from the optical signal source 1006 passes through the sensing elements 1004, light of a predetermined fiber mode is back reflected to the source and received by the data acquisition module 1006.

Figure 11:
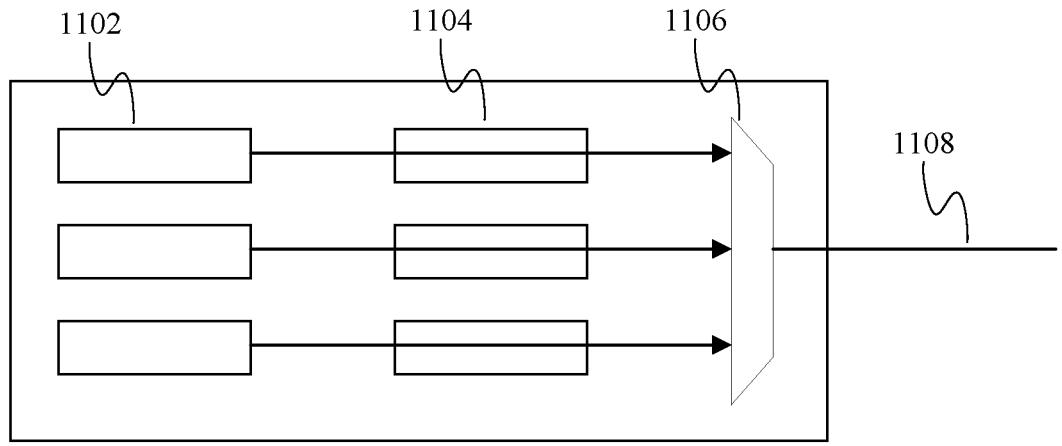
FIG. 11 illustrates an MDM transmitter utilizing an optical fiber according to an embodiment.

FIG. 11 illustrates an optical transmitter 1100 with an integrated mode-division multiplexing module. The transmitter is typically contained in a housing to enable it to be easily integrated into optical transmission equipment. A transmitter 1100 may be packaged on its own or be integrated with a receiver to form a transceiver. In some embodiments a light source 1102, which may be a diode or laser, outputs at a continuous wavelength or mode. Data is applied to the light source 1102 by a modulator 1104 which is then multiplexed with other modulated light sources to be transmitted on the HECF 1108. In some embodiments, the light source and modulator may be integrated together.

Figure 12:
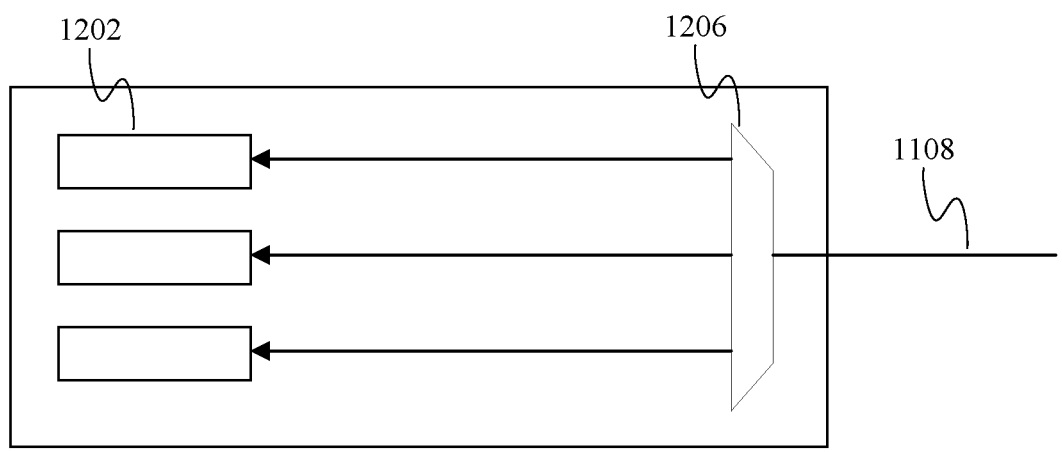
FIG. 12 illustrates an MDM receiver utilizing an optical fiber according to an embodiment.

FIG. 12 illustrates an optical receiver 1200 with an integrated mode-division de-multiplexing module. The receiver is typically contained in a housing to enable it to be easily integrated into optical transmission equipment. A receiver 1100 may be packaged on its own or be integrated with a transmitter 1100 to form a transceiver. Mode multiplexed data is received from the HECF 1108 and split into its modes in the mode demultiplexer 1206. Light of each mode is then received optical detectors 1202 which may be PIN diodes or APDs.

Figure 13:
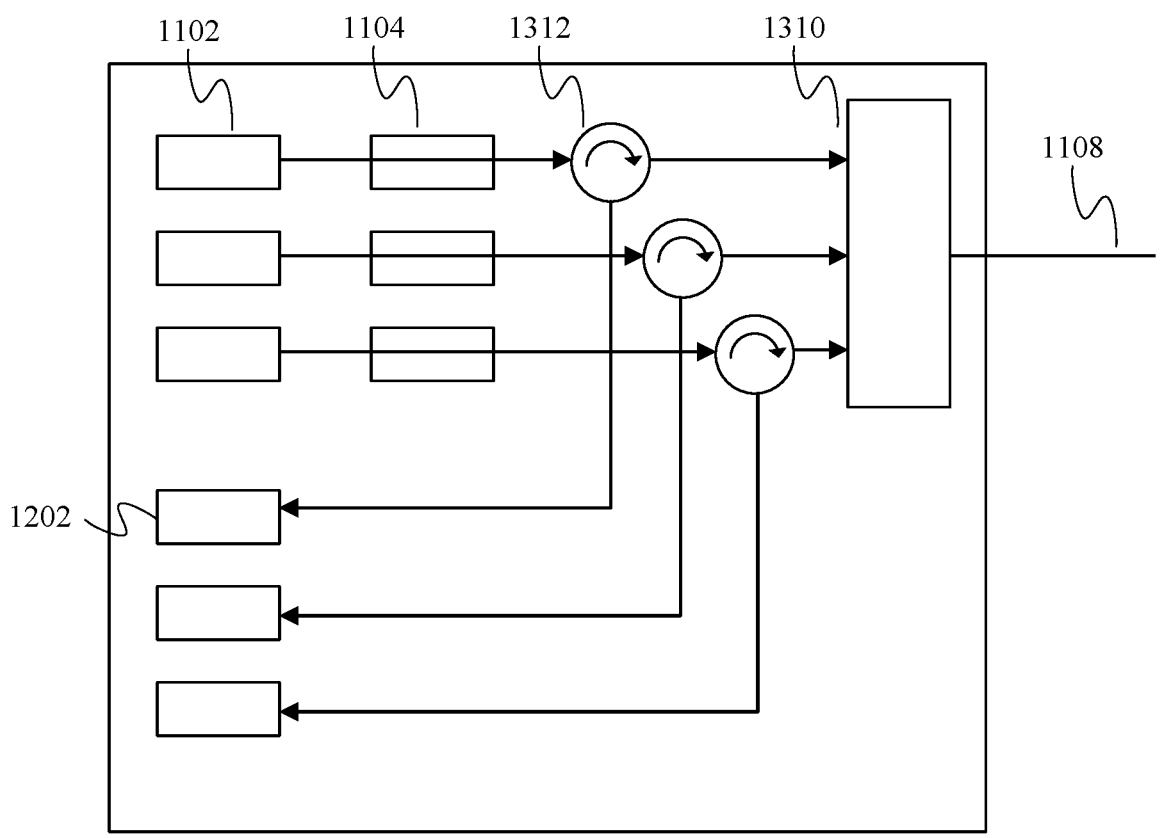
FIG. 13 illustrates an MDM transceiver utilizing an optical fiber according to an embodiment.

FIG. 13 illustrates an optical transceiver 1300 with an integrated mode-division multiplexer/demultiplexer module. The transceiver is typically contained in a housing to enable it to be easily integrated into optical transmission equipment. The transceiver 1300 combines the functionality of a transmitter 1100 and a receiver 1200. In some embodiments a light source 1102, which may be a diode or laser, outputs at a continuous wavelength or mode. Data is applied to the light source 1102 by a modulator 1104 which is passed through a circulator 1312 and then multiplexed with other modulated light sources to be transmitted on the HECF 1108. In some embodiments, the light source and modulator may be integrated together. Received light passes through the mode MUX/DeMUX 1310 and into the circulator 1312 that sends the demultiplexed received light to optical detectors 1202 which may be PIN diodes or APDs, to receive the data.

Figure 14:
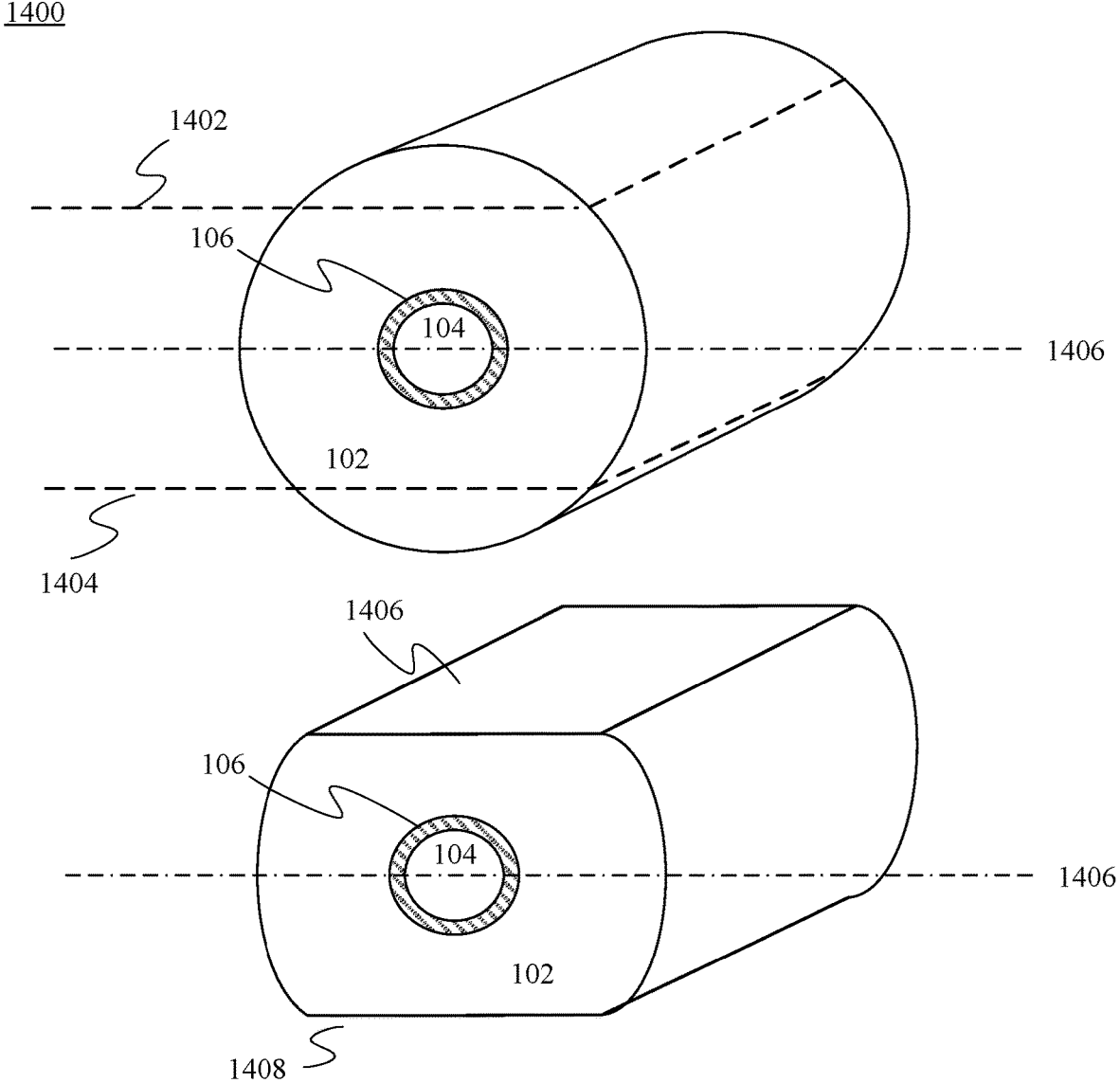
FIG. 14 illustrates a method of manufacturing an HECF according to an embodiment.
Figure 14:
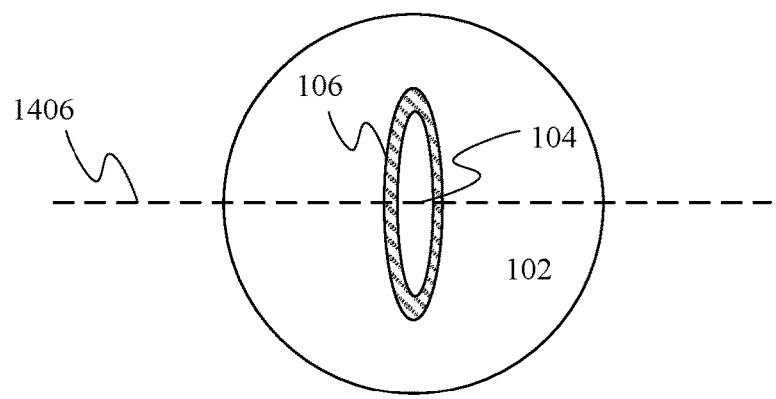

As shown in FIG. 14, the HECF 1400 may be fabricated using from a preform prepared using a modified chemical vapor deposition (MCVD) process. The preform has a cylindrical shape and includes a coaxial inner core 104 and outer cladding 102. The inner core 104 has a circular cross section. Opposing, longitudinal sides 1402, 1404 are cut from the preform resulting in two opposing, flat, parallel sides 1406 1408. The cut preform is then heated so that the flat surfaces disappear due to the surface tension and the flow of material. Consequently, the circular core 104 becomes elliptical during the heating process. The cut preform with an elliptical core is pulled to form the optical fiber. The resulting optical fiber includes a core 104 having an elliptical cross section having an aspect ratio between 2 and 40, and a cladding 102 having a circular cross section. The core 104 and the cladding 102 have a common central axis with the core 104 being enclosed by the cladding 102. Since the preform was fabricated through MCVD, it was able to include a trench 106 surrounding the core.

Those skilled in the art will appreciate that it may be possible to make a plurality of cuts that are not necessarily aligned with each other (e.g. without creating longitudinal sides) but that taken as a whole, after the heating induced reshaping, result in the elliptical core discussed above.

Figure 15:
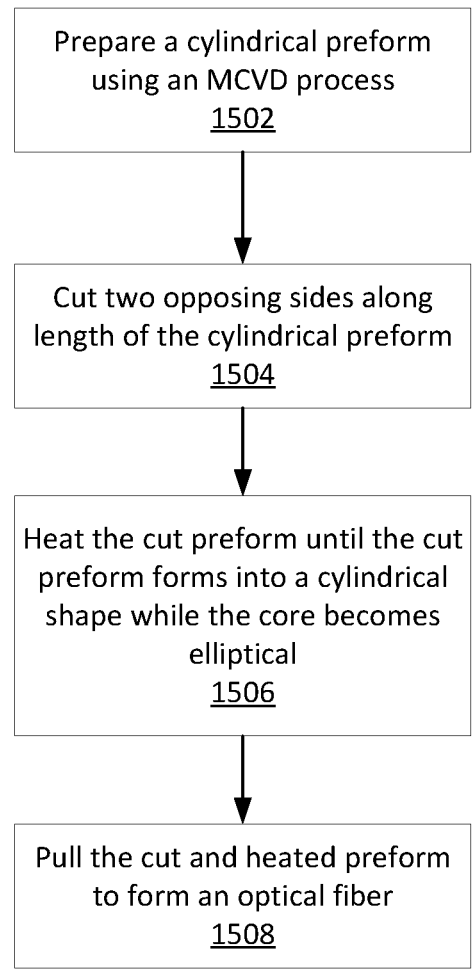
FIG. 15 is a flowchart of the method of manufacturing an HECF according to an embodiment.

FIG. 15 is a flowchart illustrating a method 1500 of manufacturing a HECF as shown in FIG. 14. In step 1502, a cylindrical preform having an inner core 104 and an outer cladding 102 is formed. The inner core 104 has a circular cross section profile. The cylindrical preform may be formed using an MCVD process. In step 1504, two opposing sides 1402 1404 of the cylindrical preform are cut along a length of the cylindrical preform to produce a cut preform with opposing parallel surfaces 1406 1408 along a longitudinal axis of the cylindrical preform. In various embodiments, the cutting of the preform is done in a manner that avoids cutting the inner core 104. In step 1506, the cut preform is heated. The surface tension of the exterior surface of the cut preform, subjected to the softening caused by the heating, allows the cut preform to distort until the exterior of the preform is circular again. The surface tension causes a distortion in the entire preform, so that when the cut preform assumes an outer circular profile, the inner core 104 has been distorted and result in an elliptical profile for the core 104. As discussed above, this generally elliptical core has an aspect ratio of between 2 and 40. The outer cladding, after enclosing (or enveloping) the elliptical core has a generally circular cross section. In step 1508, the cut and heated preform is pulled to form an optical fiber. In some embodiments, the core 104 and cladding 102 are generally co-axial, having a common central axis.

An aspect of the disclosure includes an optical fiber including a core having an elliptical cross section and an aspect ratio between 2 and 40. The optical fiber also includes a cladding, having a circular cross section, enclosing the core.

An aspect of the disclosure includes the core and the cladding have a common central axis.

An aspect of the disclosure includes an optical fiber wherein a difference of a refractive index of the cladding to a refractive index of the core is between $1\times10^{-2}$ and $1.5\times10^{-1}$.

An aspect of the disclosure includes an optical fiber wherein a ratio of a refractive index of the cladding to a refractive index of the core is between $1\times10^{-2}$ and $1.5\times10^{-1}$.

An aspect of the disclosure includes an optical fiber comprising a trench located between the core and the cladding. The trench has a uniform width and encircles the core. The refractive index of the trench is lower than the refractive index of the cladding.

An aspect of the disclosure includes an optical fiber wherein a width of the core along a y-axis allows for single mode transmission.

An aspect of the disclosure includes an optical fiber wherein a width of the core along an x-axis allows for the transmission of a plurality of mode pairs.

An aspect of the disclosure includes an optical fiber wherein each of the plurality of mode pairs have two orthogonal linear polarizations.

An aspect of the disclosure includes an optical fiber wherein the plurality of mode pairs have an effective index separation between the adjacent vector modes greater than $1\times10^{-4}$.

An aspect of the disclosure includes an optical fiber wherein the effective index separation is caused by thermal stress induced during the manufacture of the optical fiber and the elliptical shape of the core.

An aspect of the disclosure includes an optical fiber wherein the core is doped with rare earth ions.

An aspect of the disclosure includes an optical fiber amplifier (OFA) including a first WDM coupler receiving an input signal and an output from a first pump optical source. An optical fiber receiving an output from the first WDM coupler. The optical fiber includes a core having an elliptical cross section having an aspect ratio between 2 and 40. The optical fiber also includes a cladding, having a circular cross section, enclosing the core. The OFA also includes a second WDM coupler receiving the output of the optical fiber and an output of a second pump optical source. The second WDM coupler outputs an amplified optical signal.

An aspect of the disclosure includes an OFA wherein the core and the cladding have a common central axis.

An aspect of the disclosure includes an OFA wherein the core is doped with rare earth ions.

An aspect of the disclosure includes an OFA wherein the optical fiber includes a trench located between the core and the cladding. The trench has a uniform width and encircles the core. The refractive index of the trench is lower than the refractive index of the cladding.

An aspect of the disclosure includes an OFA wherein a width of the core along a y-axis allows for single mode transmission and a width of the core along an x-axis allows for the transmission of a plurality of mode pairs.

An aspect of the disclosure includes an optical sensor detecting an optical transmission of an optical mode. The optical sensor includes a plurality of sensing elements disposed along an optical fiber. The optical fiber includes a core having an elliptical cross section and an aspect ratio between 2 and 40. The optical fiber includes a cladding having a circular cross section. The core is enclosed by the cladding. The optical fiber receives an input signal including a plurality of vector modes. Each of the plurality of sensing elements reflects one of the plurality of vector modes. A data acquisition module receives one of the plurality of the vector modes reflected by one of the plurality of sensing elements. In some embodiments, the core and the cladding have a common central axis.

An aspect of the disclosure includes an optical transmitter module. The module includes a plurality of light sources. Each of the plurality of light sources outputs a constant light signal at one of a plurality of vector modes. A plurality of optical modulators receive one of the constant light signals and output a modulated light signal. A mode multiplexer receives each of the modulated light signals to produce a mode multiplexed optical output. An optical fiber receives the mode multiplexed optical output. The optical fiber includes a core having an elliptical cross section having an ellipticity between 2 and 40. The optical fiber also includes a cladding having a circular cross section, with the core being enclosed by the cladding. In some embodiments, the core and the cladding have a common central axis.

An aspect of the disclosure includes an optical receiver module including an optical fiber. The optical fiber receives a mode multiplexed optical signal. The optical fiber includes a core having an elliptical cross section having an aspect ratio between 2 and 40. The optical fiber also includes a cladding. The core is enclosed by the cladding. The optical receiver module also includes a mode demultiplexer receiving the mode multiplexed optical signal from the optical fiber and outputting a plurality of modulated light signals. Each of the plurality of modulated light signals includes light at one of a plurality of vector modes. A plurality of optical detectors each receive one of the plurality of modulated light signals. In some embodiments. the core and the cladding have a common central axis.

An aspect of the disclosure includes an optical transceiver including a transmit path and a receive path. The transmit path includes a plurality of light sources outputting a constant light signal at one of a plurality of vector modes. A plurality of optical modulators receives one of the constant light signals and outputs a modulated light signal. A plurality of circulators receives one of the modulated light signals and outputs one of the modulated light signals. A mode multiplexer receives each of the modulated light signals from the plurality of circulators to produce a mode multiplexed optical output. An optical fiber receives the mode multiplexed optical output. The optical fiber includes a core having an elliptical cross section and an aspect ratio between 2 and 40. The optical fiber also includes a cladding having a circular cross section, with the core being enclosed by the cladding. In some embodiments. the core and the cladding have a common central axis.

The receive path includes a mode demultiplexer receiving the mode multiplexed optical signal from the optical fiber and outputting a plurality of received modulated light signals. Each of the plurality of received modulated light signals includes light at one of the plurality of vector modes. A plurality of optical detectors each receives one of the plurality of received modulated light signals via the plurality of circulators.

An aspect of the disclosure includes a method for manufacturing an optical fiber. The method includes preparing a cylindrical preform having a cross section comprising an inner core and an outer cladding. The inner core has a circular profile. Cutting two opposing sides of the cylindrical preform along a length of the cylindrical preform to produce a cut preform with opposing parallel surfaces along a longitudinal axis of the cut preform. Heating the cut preform until the cut preform has a circular profile and an inner core of the cut preform has an elliptical profile. Pulling the cut preform to form the optical fiber having a core with an elliptical profile. The core has an aspect ratio between 2 and 40, and a cladding has a circular cross section. The core being enclosed by the cladding. In some embodiments. the core and the cladding have a common central axis.

An aspect of the disclosure includes a trench portion situated between the core and the cladding. The trench portion is present in the optical fiber and isolates the core from the cladding.

An aspect of the disclosure includes a cylindrical preform that is fabricated using a modified chemical vapor deposition (MCVD) process.

In another aspect of the disclosure the preform further includes a trench portion situated between the core and the cladding. The trench portion is present in the optical fiber and isolates the core from the cladding.

In another aspect of the disclosure, the elliptical profile is formed due to surface tension and the flow of material during the heating.

Unless defined otherwise, all technical and scientific terms used herein have the same meaning as commonly understood by one of ordinary skill in the art to which this invention belongs.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. An optical fiber comprising:
   a core having an elliptical cross section, the core having an aspect ratio between 2 and 40; and
   a cladding, having a circular cross section, enclosing the core,
   wherein a difference of a refractive index of the cladding to a refractive index of the core is between $1 \times 10^{-2}$ and $1.5 \times 10^{-1}$.

2. The optical fiber of claim 1 wherein the core and the cladding have a common central axis.

3. The optical fiber of claim 1 further comprising a trench located between the core and the cladding, the trench having a uniform width and encircling the core, a refractive index of the trench being lower than the refractive index of the cladding.

4. The optical fiber of claim 1 wherein a width of the core along a y-axis allows for single mode transmission.

5. The optical fiber of claim 1 wherein a width of the core along an x-axis allows for the transmission of a plurality of mode pairs.

6. The optical fiber of claim 5 wherein each of the plurality of mode pairs is comprised of two orthogonal linear polarizations.

7. The optical fiber of claim 6 wherein the plurality of mode pairs have an effective index separation between adjacent vector modes greater than $1\times10^{-4}$.

8. The optical fiber of claim 6 wherein the effective index separation is caused by thermal stress induced during the manufacture of the optical fiber and the elliptical shape of the core.

9. The optical fiber of claim 1 wherein the core is doped with rare earth ions.

10. An optical fiber amplifier comprising:
- a first WDM coupler receiving an input signal and an output from a first pump optical source;
- an optical fiber receiving an output from the first WDM coupler, the optical fiber comprising a core having an elliptical cross section, the core having an aspect ratio between 2 and 40, and a cladding, having a circular cross section, enclosing the core, the optical fiber further comprising a trench located between the core and the cladding, the trench having a uniform width and encircling the core, a refractive index of the trench being lower than the refractive index of the cladding; and
- a second WDM coupler receiving the output of the optical fiber and an output of a second pump optical source, the second WDM coupler outputting an amplified optical signal.

11. The optical fiber amplifier of claim 10 wherein the core and the cladding have a common central axis.

12. The optical fiber amplifier of claim 10 wherein the core is doped with rare earth ions.

13. The optical fiber amplifier of claim 10 wherein a width of the core along a y axis allows for single mode transmission and a width of the core along an x-axis allows for the transmission of a plurality of mode pairs.

* * * * *